W. A. TERRY.
Calendar-Clock.

No. 165,432.

Patented July 13, 1875.

WITNESSES
John Pollitt
Geo. A. Goudy

INVENTOR
William A. Terry
By James Shepard
Atty.

UNITED STATES PATENT OFFICE.

WILLIAM A. TERRY, OF BRISTOL, CONNECTICUT.

IMPROVEMENT IN CALENDAR-CLOCKS.

Specification forming part of Letters Patent No. 165,432, dated July 13, 1875; application filed May 14, 1875.

*To all whom it may concern:*

Figure 1:
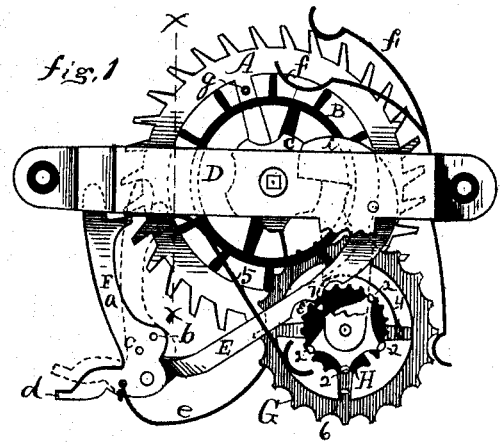
Figure 2:
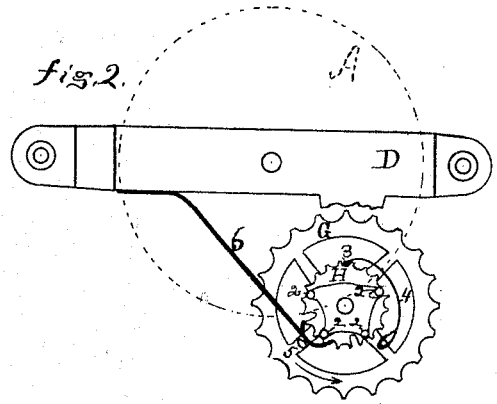
Figure 3:
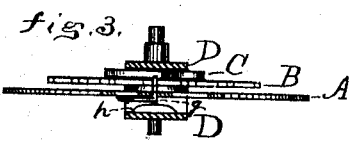

Be it known that I, WILLIAM A. TERRY, of Bristol, in the county of Hartford and State of Connecticut, have invented certain new and useful Improvements in Calendar-Clocks, of which the following is a specification:

In the accompanying drawing, Figure 1 is a front elevation of a calendar mechanism which embodies my invention. Fig. 2 is a similar view of a detached portion of the same, and Fig. 3 is a partial section of a portion thereof, taken on line $x$ $x$ of Fig. 1.

This invention relates to the mechanism for making the changes at the end of each month, including the proper leap-year changes, for many centuries, thereby producing a calendar which is substantially perpetual.

A designates the month-wheel, which counts the days of the month; B, the year-wheel, which counts the months of the year; and C the cam, which regulates the lengths of the months, all revolving on a common center within the frame D, and the first two provided with indicators in any ordinary manner. To the frame D a bell-crank lever or pawl, E, is hung, and to the outer end of said lever another lever or pawl, F, is hung, by means of a stop-joint, one arm, $a$, of which lever F projects upward just under or back of the rim of the wheel A. Said arm $a$ also carries a pin, $b$, and a stop, $c$, which stop engages with the frame D, and prevents the levers E F from being raised beyond a certain point. To the arm $d$ of the lever F a spring, $e$, which extends from the frame D, is secured to hold the arm $a$ of lever F away from the wheel A, as shown in Fig. 1, and also to hold the lever E down, and prevent it rising when the arm $d$ of lever F is lifted, until the upper arm $a$ of said lever F is thrown inward to the position indicated by broken lines in Fig. 1. Friction-springs $ff$ bear on the peripheries of the wheels A B, and prevent them from rotating only by design. This mechanism is placed within a clock-case, and the clock movement is provided with mechanism arranged in such relation to the calendar mechanism that once in twenty-four hours the arm $d$ of the lever F is operated upon to raise the levers F E to a certain point.

At about midnight each day during the month the arm $d$ of the lever F is lifted by the clock mechanism, as in ordinary calendars, when the arm $a$ swings inward, until its stop-joint is brought home, as indicated by broken lines in Fig. 1, after which the lever E moves upward with the lever F, and the pin $b$ engages with one of the teeth of the wheel A, and as soon as the stop $c$ approaches the under side of the frame D the pin $b$ has rotated the wheel A one tooth, and the pointer or index moving with said wheel indicates another day upon the dial.

Projecting from the rear of the wheel A there is a spring-pin, $g$, fitted so as to move out and in through a hole formed in the wheel A, and therefore moving with said wheel. This spring-pin may consist of a sheet-metal or wire spring secured to the rear of the wheel A, and having a pin on it projecting through a hole in said wheel. Upon the inside of the rear plate of the frame D there is a stationary cam or incline $h$, Fig. 3, and at the end of each month the spring-pin $g$ must pass this incline $h$, when it engages therewith, and projects the pin forward, so as to throw it between the teeth of the wheel B and lock said wheels together, so that when the wheel A moves the wheel B must move with it, until the spring-pin $g$ has passed the incline $h$, and withdrawn from wheel B, the incline $h$ being of such length as to carry the wheel B one tooth, or just one-twelfth of a revolution, and its index indicates another month upon the dial.

The short arm $i$ of the lever E rests upon the edge of the cam C, which cam contains five notches or depressions, which compensate for the five short months of each year. This cam is secured rigidly to the wheel B, so as to rotate with it. Pins set in the side of said wheel would perform the same office, and are considered the equivalent of said cam. In Fig. 1 the short arm $i$ of the lever E is received in the February-notch of the cam C, which being the deepest depression the levers E F fall lower than when the short arm rests upon any other portion of the cam C. In the rim of the wheel A, and projecting to the rear, there is a pin, indicated by broken lines in Fig. 1, which assists in regulating the lengths of the months, and which at the end of each month is caught by the end of arm $a$, when said arm carries the wheel A with it, the pin being so placed in the wheel A that when the arm $a$ is carried to its full height it will always leave the wheel A with its index indicating the first day of the month.

I prefer to employ thirty-two teeth in the month-wheel A, so that it may move a greater space at the end of each month, and thereby change the year-wheel, which indicates the months quicker than can be done with a thirty-one-toothed wheel; but so far as the invention herein claimed is concerned the month-wheel may have either thirty-one or thirty-two teeth, as may be desired.

The lower the levers E F fall the sooner each month will the pin engage with the arm $a$, and carry the pointer from the last day of the short months to the first day of the next month. When the short arm $i$ of lever E is received in a notch of the cam C that represents a thirty-day month, the arm A of lever F will fall low enough so that its upper end will engage with the pin on wheel A at the end of the thirtieth day, and when said arm is raised it will carry the wheel A and its index over the thirty-first day and the blank space, if thirty-two teeth are used, to the first day of the next month.

The notch in the cam C for February will allow the levers E F to fall so far that the pin in wheel A is caught by the arm $a$ at the end of the twenty-eighth day, and carried forward to the first day of the next month.

The parts thus far described after being once set and operated daily, will correctly indicate the months and day of the months, with the exception of leap-year. To represent leap-year it is only necessary to provide mechanism which once in four years will hold the levers E F one tooth higher, and prevent the arm $a$ from engaging with the pin on wheel A until the twenty-ninth day of the month; but even then the calendar would not be perpetual, because leap-year is omitted upon the beginning of each century for three successive centuries, and added upon the beginning of the fourth century.

At one side of the wheels A B I place two wheels, G H, each of which has twenty teeth. Upon the year-wheel B there is a pin, (not shown,) which once each year engages with the teeth of the twenty-year wheel G, and rotates it one tooth, or one-twentieth of a revolution. Secured to the wheel G, and moving with it, there are four fixed points, 2 2 2 2, and one adjustable point, 3, formed on the end of spring 4, which spring is secured to the wheel G. This point 3 rests in the teeth of the four-hundred-year wheel H, and thereby causes it to revolve with the wheel G, unless otherwise prevented.

Upon the wheel G there is a trip-pin, 5, which, at each revolution of the wheel G, engages with the spring-trip 6, which is attached to the frame D, and has two curved arms, as clearly shown. The wheel G rotates in the direction indicated by the arrow in Fig. 2, and when the trip-pin 5 comes round to the spring-trip 6, the short arm of said trip is caught by the pin 5, which forces the trip 6 inward and engages it with the teeth of wheel H. At the same time a cam or incline upon the frame D, (not shown,) engages with the adjustable point 3 of spring 4, and lifts it out of the teeth of the wheel H, so as to release it therefrom. While the wheel G is moving the wheel H is held stationary by means of the trip 6, until the wheel G has moved one tooth, after which the parts 3, 4, and 6 return to their former position, and the next movement of the wheel G carries wheel H with it, as before described. Upon the under edge of the lever E there is a projection, 7, which, when the points 2 2 2 2 3 come under it, will fall upon said points. As the wheel G revolves once in twenty years, and there are five points, it is evident that one point will come under the point 7 of the lever E once every four years, and that the adjustable point will come under point 7 once every twenty years. The points 2 2 2 2 are of such length that when the lever engages therewith it will not fall so far by the space of one tooth of the wheel A as it otherwise would fall in February, and twenty-nine days will be counted for February. For convenience I will designate the teeth of wheel H by the recesses instead of by the points. Three of these are deep teeth, to wit, the fifth, tenth, and fifteenth, and the remainder of them are shallow teeth. When the adjustable point 3 rests in a shallow tooth, and engages with the point 7 of lever E, said lever will be held at the same height as when resting upon the fixed points 2, and therefore twenty-nine days will be counted for February. As the adjustable point changes from one tooth to the succeeding tooth once every twenty years, it is evident that in one hundred years it will rest in the fifth tooth or first deep tooth, when said point will fall so low as to allow the lever to drop to the full depth of the February-cam, and twenty-eight days will be counted for February—that is, leap-year will be omitted at the beginning of the century, which omission will take place three successive centuries, and at the beginning of the fourth century the adjustable point will be in the twentieth tooth, (a shallow one,) and leap-year will be counted. In case it is desired to omit the changes for the beginning of the centuries, a fixed point, 2, may be substituted for the adjustable point 3, when the calendar will count correctly with the exception of once in one hundred years.

I claim as my invention—

1. A pawl or lever, which operates the month-wheel, arranged to move a distance varying to correspond with the length of the months, in combination with a pin or other particular point of engagement with or upon the month-wheel, substantially as set forth.

2. The wheel A, provided with the pin for regulating the number of days in the month, in combination with the wheel B, cam C, levers E $i$ and F $a\,b\,d$, all operating together substantially as described.

3. The spring-pin $g$, in combination with the wheels A B, and incline $h$ of the frame D, all operating together substantially as described.

4. The combination of the wheels A B, cam C, levers E F, wheel G, and points 2, all operating together substantially as described.

5. The wheels G H, revolving together with a differential motion, in combination with the adjustable leap-year point, substantially as and for the purpose described.

6. The combination of the wheels A B, cam C, levers E F, wheels G H, and points 2 2 2 3, all operating together substantially as described.

7. The compound lever E F, in combination with the spring $e$, attached to arm $d$ of the lever F, substantially as described, and for the purposes set forth.

WM. A. TERRY.

Witnesses:
JAMES SHEPARD,
JOEL T. CASE.